June 14, 1966  A. R. DAVIS ETAL  3,255,666
COLOR FILTER SLIDE HOLDER AND CHANGER
Filed May 3, 1962  6 Sheets-Sheet 1
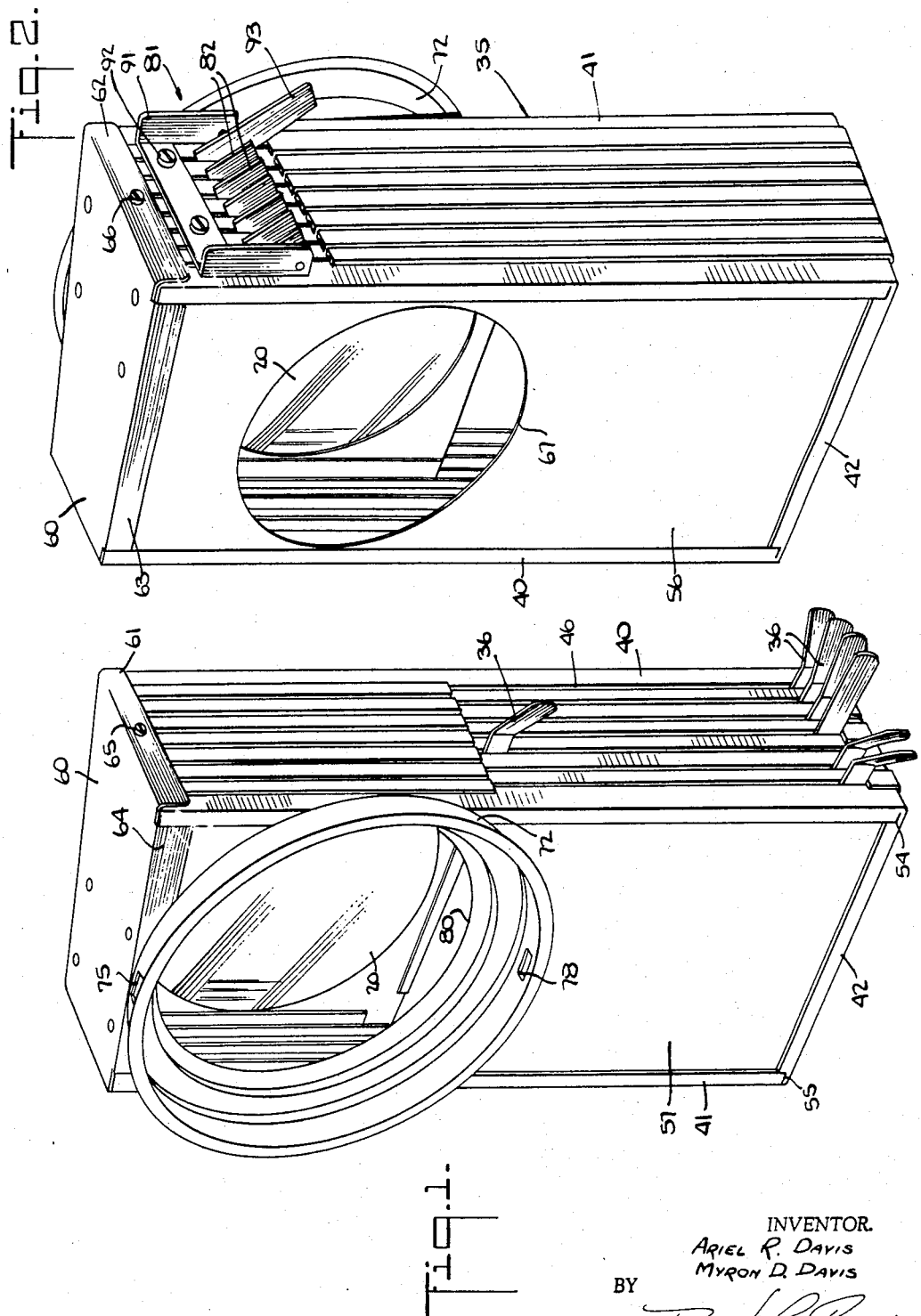
INVENTOR.
ARIEL R. DAVIS
MYRON D. DAVIS
BY
Frank C. Bauer
their ATTORNEY

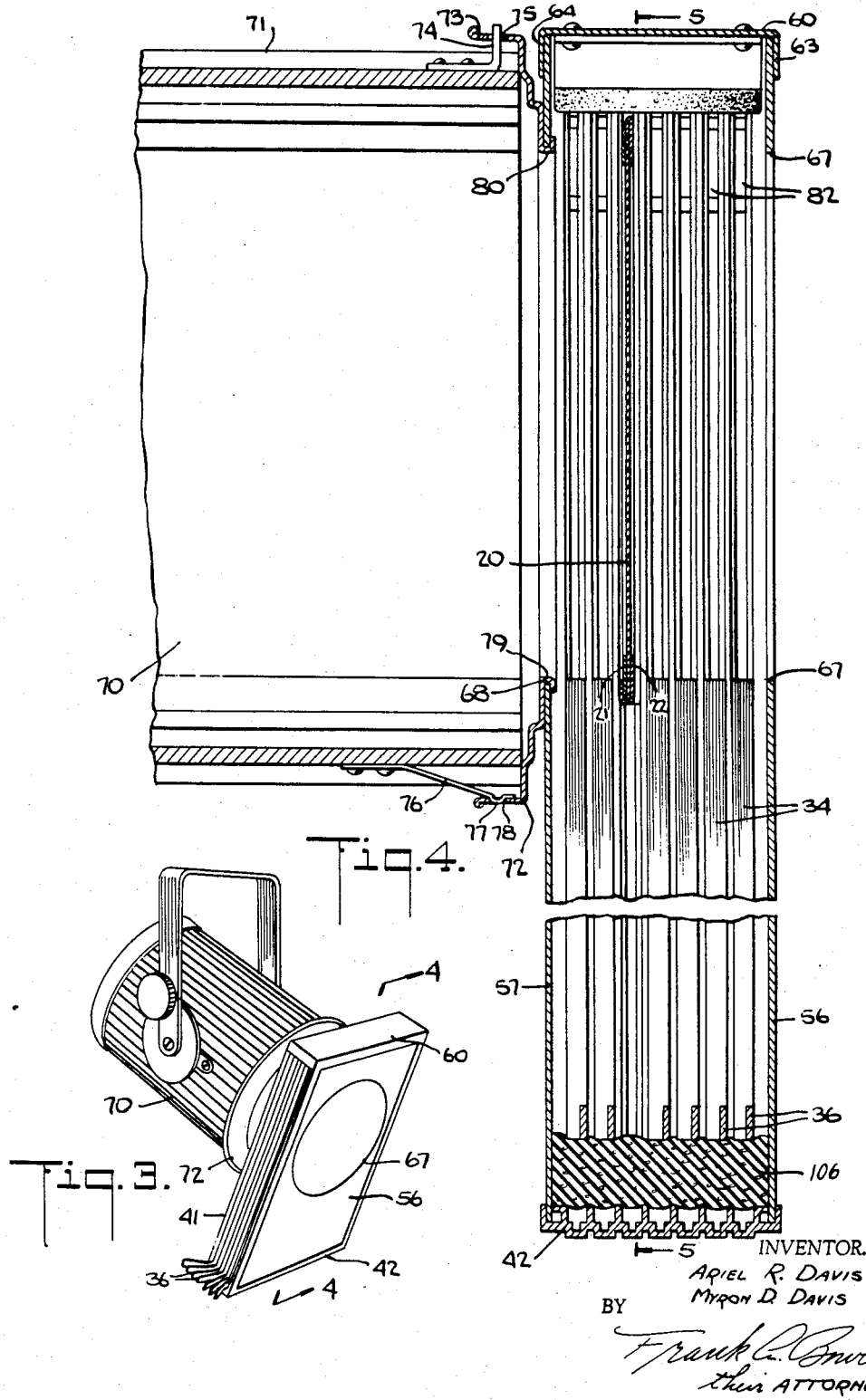

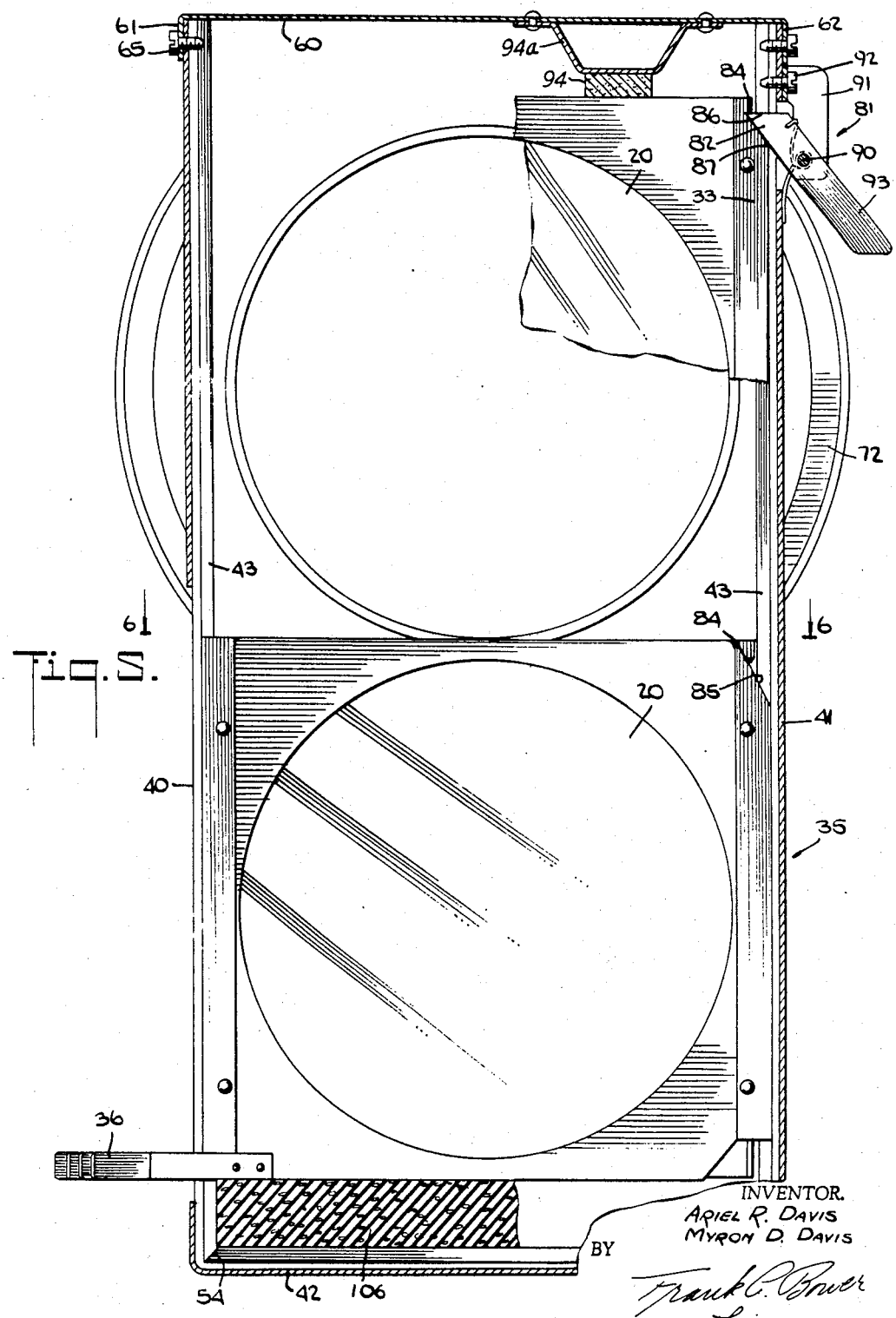

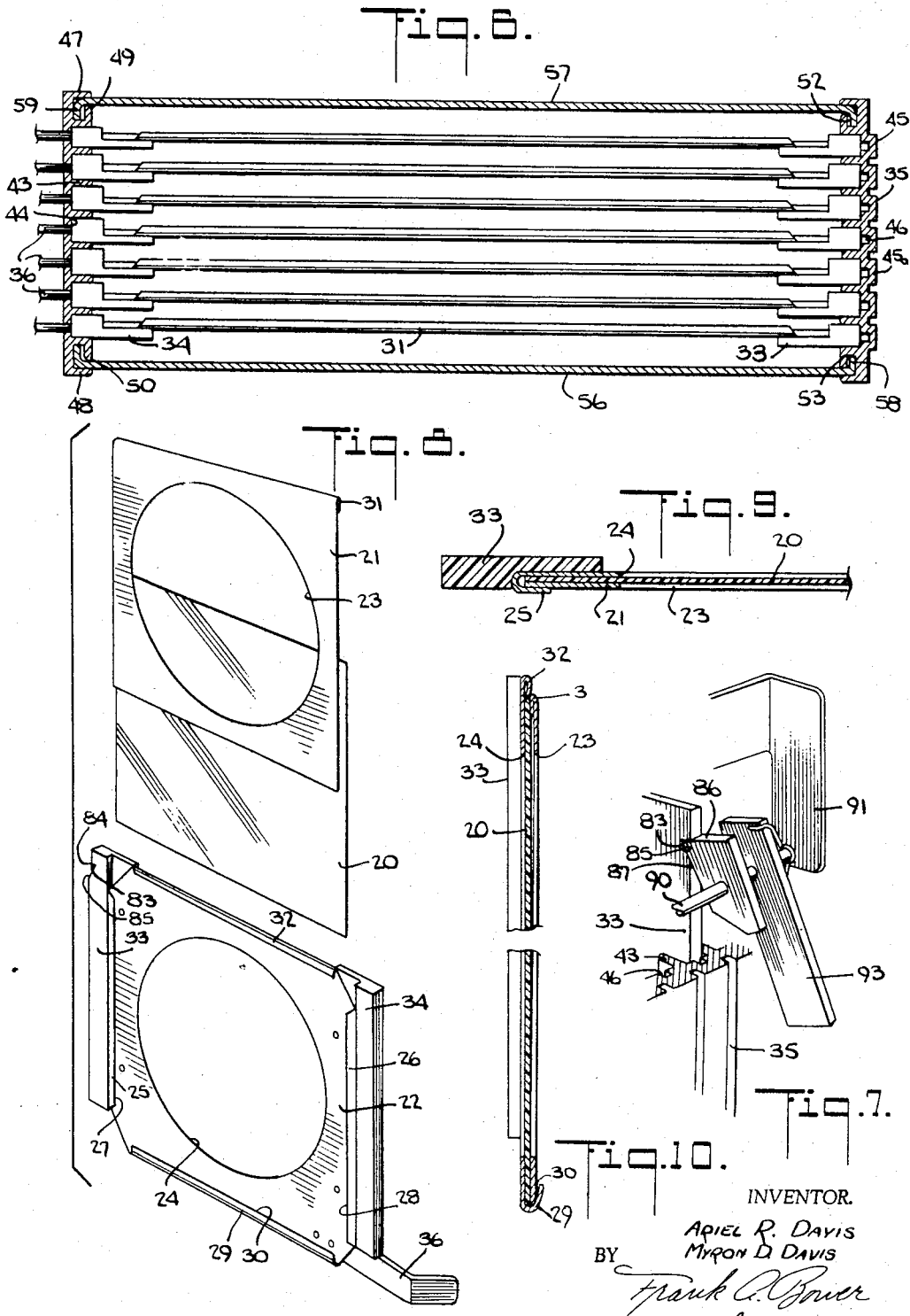

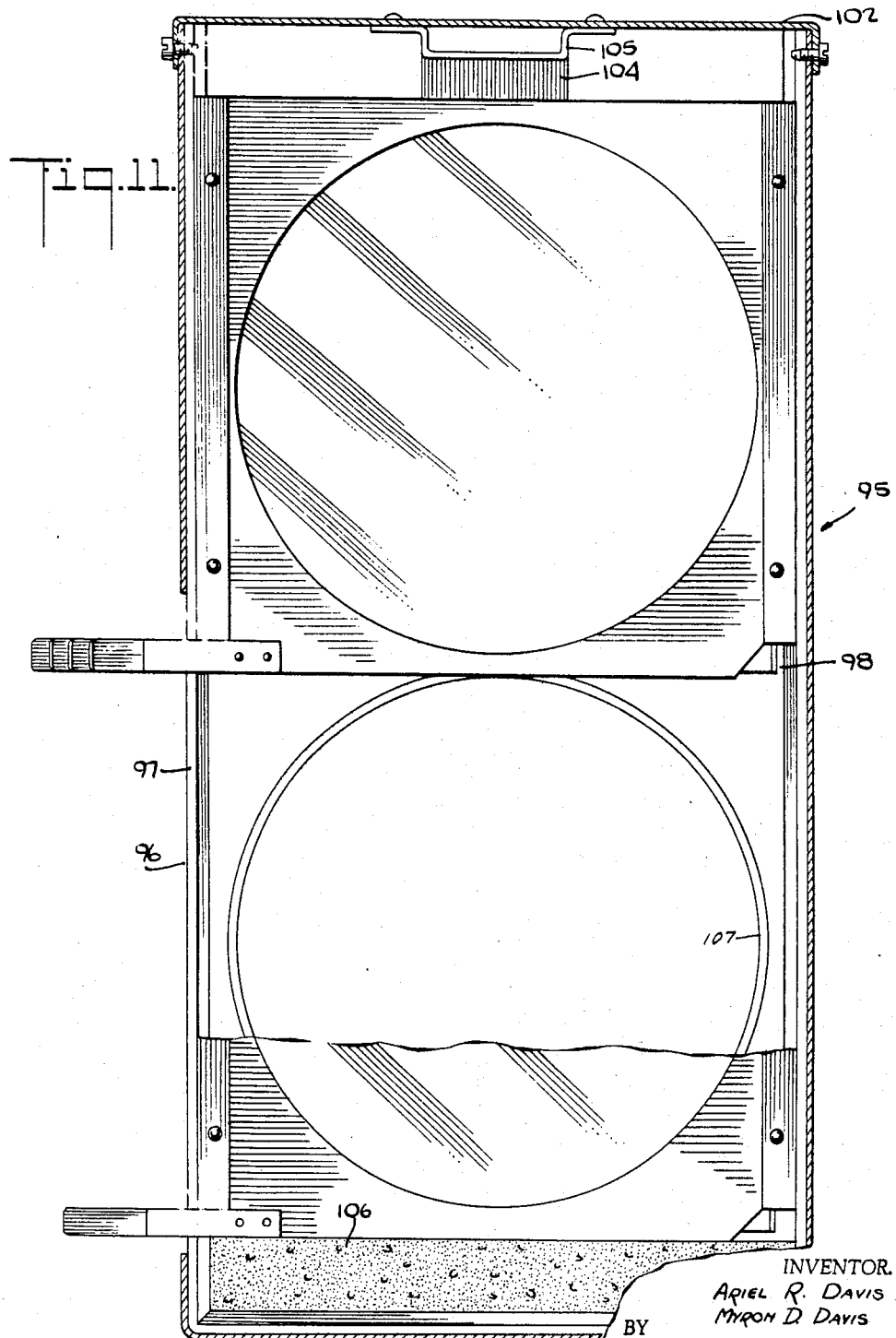

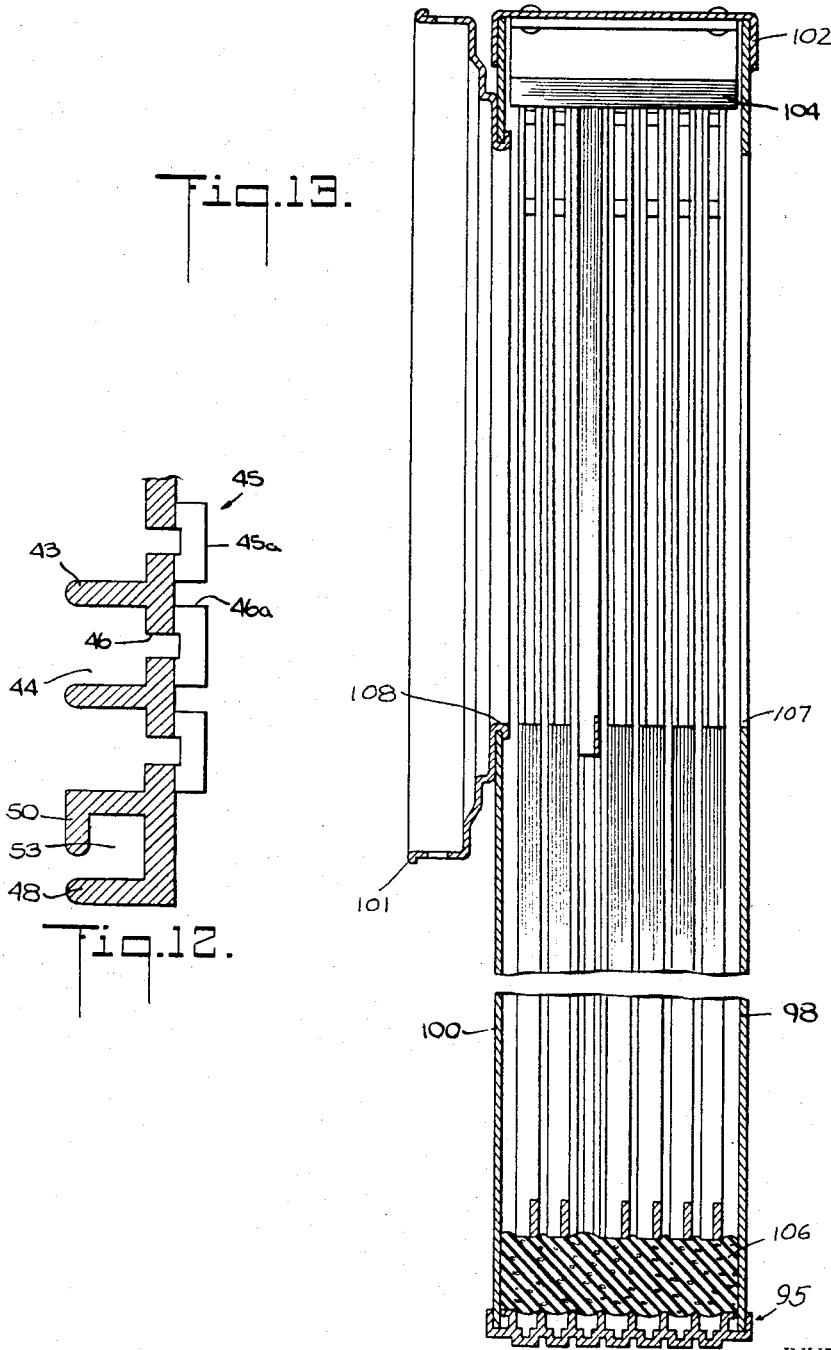

United States Patent Office 3,255,666
Patented June 14, 1966

3,255,666
COLOR FILTER SLIDE HOLDER AND CHANGER
Ariel R. Davis and Myron D. Davis, Salt Lake City, Utah, assignors to B. J. Management Corporation, Salt Lake City, Utah, a corporation of Utah
Filed May 3, 1962, Ser. No. 192,253
2 Claims. (Cl. 88—113)

This invention relates to mounting and storing of color slides on a stage light and positioning of individual slides in the path of the emitted light.

It is desirable in stage lighting to readily provide various types of colored illumination. This illumination is usually provided by positioning a colored filter in front of the white light produced by stage light. At the present time these filters are usually a thin plastic film mounted in a frame. A mounting for a single frame is usually provided at the front of the light for inserting the frame with the colored filter. The great difficulty is that the colored filters become lost or damaged and are, therefore, not always readily available.

The present color slide changers that store a plurality of different colored filters on stage lights are heavy and expensive and, since the changer is merely a storage device, it is difficult to justify the expense of purchasing a color changer for each light. For this reason, color slide changers have not had a wide use and the problem of the availability of filters is still encountered in the stage lighting field.

An object of the invention is to provide a color slide changer which will store a plurality of colored filters and provide means for easily moving and retaining the colored filters in place in front of the light.

Another object of the invention is to provide a multiple storage colored slide changer that is light in structure and inexpensive to manufacture and easily fits on the front of a stage light.

Other objects and advantages will be apparent from the following description taken in connection with the drawings in which:

FIGS. 1 and 2 illustrate rear and front perspective views of one embodiment of the color slide changer;

FIG. 3 is a perspective view of the color slide changer mounted on a stage light;

FIG. 4 is a sectional view taken along lines 4—4 of FIG. 3 to illustrate the mounting of the color slide changer on a stage light;

FIG. 5 is a sectional view of the embodiment illustrated in FIG. 2 taken along lines 5—5 of FIG. 4;

FIG. 6 is a sectional view taken along lines 6—6 of FIG. 5;

FIG. 7 is a fragmentary perspective view of the catch means and the supporting wall in section;

FIG. 8 is an exploded view of the color slide;

FIGS. 9 and 10 are sectional views of the color slide;

FIG. 11 is a longitudinal sectional view of another embodiment of the color slide changer with the light passing space above the storage space;

FIG. 12 is an enlarged cross sectional view of the casing wall; and

FIG. 13 is a modification of the embodiment of FIG. 11 with the storage space below the light passing space.

In FIGS. 8, 9 and 10 a color slide or filter is illustrated which has been adapted to the casings, as illustrated in FIGS. 1 and 2. The color slide or filter comprises a plastic colored filter sheet 20 which is mounted between two thin sheet metal frames 21 and 22 having openings 23 and 24 for passing light. The frame 22 has turned flanges 25, 26 forming side grooves 27, 28 and the bottom turned flange 29 to form a bottom groove 30. The filter 20 and the frame 21 fit into these grooves to firmly hold the filter 20 between the two frames. The upper edges of the frames 21, 22 have flattened beads 31 and 32 to produce a squeezing action to firmly hold the frame 21 in the frame 22. Fastened to each side of the frame 22 are plastic runners 33, 34 fitting in the casing 35 in a manner later explained herein. A handle 36 is fastened along the bottom of the frame 22 to project through the casing 35 for manipulation of the slide.

If the filter is damaged or it is desirous to replace it with a different color filter, the frames 21 and 22 are easily separated and another filter 20 inserted therebetween.

In FIGS. 1, 11 and 13 three embodiments of the invention are illustrated. In FIGS. 1 and 13 the color slides are stored below the openings passing the light, and in FIG. 11 the color slides are stored above.

Referring to the embodiment of FIGS. 1 and 2, the casing 35 is a single piece of extruded aluminum formed into a U shape to form sides 40 and 41 and a bottom 42. The strip may be extruded at any desired length and then cut to form the individual pieces for the casing. The casing wall 45 has alternate overlapping grooves 46 and 46a in the inner and outer surfaces of the wall respectively. On the inner side and between the grooves 46 are inwardly extending parallel fins 43 normal to the wall. The fins form channels 44 in which the runners 33 and 34 of the color slide are slideably fitted. The grooves 46 are at the bottom of the channels and in communication therewith. In forming the grooves 46 into slots, as illustrated in FIGS. 1 and 12, for passing the handles 36 through the wall 45, the outer surface is milled or ground. The grooves 46a are provided to assist in this operation by forming the severed metal into small chips or pieces. Along the outer edges of the casing are L-shaped grooves 52, 53 formed by flanges 47, 48 and flanges 49 and 50 extending outwardly and transversely from the inner fins 43. The strip is notched at 54 and 55 to permit the bending of the strip into the U shape to form the sides 40, 41 and the bottom 42. The fins 43 and grooves 44 provide channels for the runners 33 and 34 of the color slides for the longitudinal movement of the slides.

The front and back of the changer are provided with thin metal panels 56 and 57 having flanges 58, 59 respectively at each end turned normal to the panels for fitting in the L-shaped grooves 52, 53. The flanges 58 overlap with the flanges 50 and the flanges 59 overlap with the flanges 49 to interlock the sides of the casing and hold the casing sides together. At the top of the casing a cover 60 has end flanges 61, 62 overlapping the sides of the casing and side flanges 63, 64 to overlap with the panels 56 and 57. The flanges 61 and 62 also cooperate to hold the sides of the casing together and have openings for passing the bolts 65 and 66 to fasten the cover 60 to the casing 35.

The casing and panels form a chamber having a light passing space and a color slide storage space. At the upper end the panels 56 and 57 have openings 67 and 68 for passing the light from the lamp through the light passing space. On the panel 57 means for mounting the changer to the casing 70 of a spotlight is provided in the form of an end piece 72 which has an annular flange 73 telescopically fitting on the end of the casing 70 and secured thereto by L-shaped member 74 fitting in an opening 75 and a leaf spring member 76 secured to the casing 70 and having a knob 77 fitting in an opening 78. The casing 70 may be of the type described in detail in the co-pending application Serial No. 31,984 filed May 26, 1960 of Ariel R. Davis, now Patent No. 3,116,022 issued December 31, 1963. Another type of flange could be attached for fastening the changer to other types of spotlights. The flange 79 forms an opening 80 in the end piece and is turned to overlap with the panel 57. The wall sections 45a on the side 40 are removed by grinding or other suitable means so that the grooves 46 form longitudinally extending slots through which the handles 36 of the slides extend. The slots extend approximately halfway along the side to permit the slide to be raised into position between the openings 67 and 68. On the bottom 42 a resilient member 106 is secured thereto to provide a cushion against which the slides drop when released from the upper position. On the cover 60 is a resilient stop or bumper 94 mounted on a bracket 94a secured to the cover. The bumper 94 limits the upper travel of the slides for positioning in relation to the catch means 81 and to provide silent change of slides.

The slides are held in the upper position by the catch means 81 which comprises a plurality of latches 82 respectively fitting in the grooves in which the runners 33 are fitted. The runners 33 have notches 83 with an upper edge 84 normal to the movement of the slide and an edge 85 sloped to the movement of the slide. Each of the latches 82 has an upper surface 86 generally normal to the movement of the slide and a surface 87 sloped to the movement of the slide. As the runner 33 engages the surface 87, the latches 82 are rotated outwardly to permit the raising of the slide, and then the respective latch fits in the notch in the runner 33 with the surface 86 engaging the surface 84 thus holding the slide in position. The bumper 94 prevents the slide from passing the catch, so that the catch drops into the notch, and also prevents the contacting of the handle 36 against the casing at the end of the slot. To change the slides, another slide is raised engaging another latch 82 rotating the latch mechanism outwardly releasing the former slide which drops to the storage position, and the replacing slide is then latched in place. The latches 82 are rigidly secured to a shaft 90 which is rotatably mounted in U-shaped bracket 91. The bracket 91 is fastened to the side of the casing by the screws 92. A handle 93 projects from one of the latches to permit the manual release of the held slide.

The color slide changer is easily assembled with the color slides fitted into the grooves and slots by slightly separating the walls 40 and 41 of the casing and inserting the handles 36 into the slots and fitting the runners into the grooves. The panels 56 and 57 may be then slid into place and the cover 60 fastened.

The embodiments illustrated in FIGS. 11 and 13 are generally similar to that of FIGS. 1 and 2. The casing 95 is the same as the casing 35 with the side 96 ground to form the slots 97 for the handles 36.

In the embodiment of FIG. 13 panels 98 and 100 are provided to fit in the casing and enclose the storage space. Openings 107, 108 are provided through the panels for passing the beam from the spotlight above the storage space, and the panel 100 is provided with a mounting end piece 101 for fastening the color slide changer to the spotlight.

The cover 102 is similar to the cover 60 but instead of having a bumper 94 for limiting the upward movement of the slide frames, a permanent magnet 104 is mounted on a bracket 105 riveted to the cover. The frames of the slide are made of steel and are held in place in the light passing space by the magnetizing action of the magnet.

In both embodiments a lower cushion 106 is provided to absorb the impact of the frame returning to the storage space.

In FIG. 11 the color slides are stored above the light passing space instead of below as in the embodiments of FIGS. 1 and 13. The panels 98 and 100 of FIG. 13 are similarly mounted in the casing 95 as the panels 56 and 57 are mounted in the casing 35 to slide in the grooves 52 and 53 by removing the panels 98 and 100 and turning them around so that the light passing openings 107, 108 are at the bottom and the storage space is at the top. The color slides are retained in the upper storage position by the magnet 104 and the color slides are moved down for positioning in front of the spotlight.

Various modifications and changes may be made in these embodiments without departing from the scope of the invention set forth in the appended claims.

We claim:

1. A color slide changer comprising a single piece extruded casing having a U shape to form a bottom and two sides, said casing having a plurality of inwardly facing longitudinally extending recesses and a plurality of parallel inner fins positioned between said recesses to form a plurality of spaced grooves extending longitudinally and parallel to said recesses and in communication therewith, two pairs of peripheral fins extending parallel to said inner fins with one fin of each pair having an angulated member to form L-shaped slots between the fins of a respective pair, front and rear panels having flanges fitting in said L-shaped slots to interlock said panels and casing, a cover extending across the open end and having flanges overlapping with the sides of said casing and having fastening means for securing the cover to said casing, said panels and casing forming a space for passing a light beam and a storage space for colored filter slide frames not positioned in the light passing space, openings in said panels on each side of said light passing space, color slide frames slidably mounted in said grooves for movement between said storage space and said light passing space, said frames each having a notch, said casing having a reduced portion at one end of one of said sides to form said recesses into slots extending therethrough communicating with said grooves, a latch means having a catch extending into a respective slot and groove, and a rotatable shaft securing said latches together in fixed relation for holding a frame in the light passing space by a respective catch fitting in a respective notch of a retained frame and releasing a retained frame on movement of another frame into the light passing space.

2. A color slide changer as set forth in claim 1 wherein said casing has a second reduced portion forming said recesses into a second set of slots passing through the casing into communication with said grooves, said frames having handles for moving said frames extending through said slots for mechanical movement of said frames into locking position with said latch means.

References Cited by the Examiner

UNITED STATES PATENTS

| | | | |
|---|---|---|---|
| 1,683,170 | 9/1928 | Di Carlo | 240—3.1 X |
| 1,729,163 | 9/1929 | Drew | 240—3.1 |
| 1,742,601 | 1/1930 | Kliegl et al. | 240—3.1 |
| 2,059,361 | 11/1936 | Kentworthy. | |
| 3,053,146 | 9/1962 | King | 88—28 |

DAVID H. RUBIN, *Primary Examiner.*